(12) United States Patent
van Houten

(10) Patent No.: US 7,798,140 B2
(45) Date of Patent: Sep. 21, 2010

(54) ADAPTIVE SELF PUMPING SOLAR HOT WATER HEATING SYSTEM WITH OVERHEAT PROTECTION

(75) Inventor: Arnoud van Houten, Reston, VA (US)

(73) Assignee: Sunnovations LLC, Reston, VA (US)

(*) Notice: Subject to any disclaimer, the term of this patent is extended or adjusted under 35 U.S.C. 154(b) by 0 days.

(21) Appl. No.: 12/587,392

(22) Filed: Oct. 6, 2009

(65) Prior Publication Data
US 2010/0083952 A1   Apr. 8, 2010

Related U.S. Application Data

(60) Provisional application No. 61/195,288, filed on Oct. 6, 2008.

(51) Int. Cl.
*F24J 2/32* (2006.01)
(52) U.S. Cl. .................. 126/635; 126/634; 126/636; 126/638; 165/104.22; 165/154
(58) Field of Classification Search .......... 126/638, 126/634, 635, 636; 165/154, 104.22
See application file for complete search history.

(56) References Cited

U.S. PATENT DOCUMENTS

| | | | | |
|---|---|---|---|---|
| 4,061,131 A | * | 12/1977 | Bohanon | 126/590 |
| 4,110,986 A | * | 9/1978 | Tacchi | 60/641.8 |
| 4,159,017 A | * | 6/1979 | Novi | 126/611 |
| 4,207,034 A | * | 6/1980 | Zeimer | 417/379 |
| 4,246,890 A | * | 1/1981 | Kraus et al. | 126/636 |
| 4,266,929 A | * | 5/1981 | Swenson | 431/20 |
| 4,270,521 A | * | 6/1981 | Brekke | 126/563 |
| 4,299,200 A | * | 11/1981 | Spencer | 126/584 |
| 4,340,030 A | * | 7/1982 | Molivadas | 126/635 |
| 4,346,731 A | * | 8/1982 | Sigworth, Jr. | 137/433 |
| RE31,032 E | * | 9/1982 | French | 126/637 |
| 4,385,625 A | * | 5/1983 | Lee | 126/590 |
| 4,409,959 A | * | 10/1983 | Sigworth, Jr. | 126/592 |
| 4,413,615 A | * | 11/1983 | Sigworth, Jr. | 126/584 |

(Continued)

OTHER PUBLICATIONS

Anon.; *The Copper Cricket Brings Solar water Heating to Life*; Home Power Magazine; Issue 8; Dec. '88/Jan. '99; p. 20.

(Continued)

*Primary Examiner*—Kenneth B Rinehart
*Assistant Examiner*—Jorge Pereiro
(74) *Attorney, Agent, or Firm*—James Creighton Wray

(57) ABSTRACT

Solar collectors heat and self pump heat transfer fluid at reduced system pressure without mechanical intervention for heat exchange with hot water in a storage tank. Slugs of hot fluid are pumped by steam bubbles formed in solar collector tubes through an upper manifold and an exit-tube into an upper hot fluid reservoir. Hot fluid flows downward through a heat exchanger at the tank. Cold fluid returns to a lower reservoir. Vapor flows from the upper reservoir and is condensed by cooler water and walls of the lower reservoir. The cool fluid returns from the lower reservoir to a lower manifold supplying the collector tubes. Below ambient pressure is automatically established in the system. When heat build-up increases pressure in the system, fluid flows to a third closed variable volume reservoir. A float valve in the bottom of the third reservoir allows liquid to return to the system when it cools.

20 Claims, 7 Drawing Sheets

U.S. PATENT DOCUMENTS

| | | | | |
|---|---|---|---|---|
| 4,458,669 A | * | 7/1984 | Lee | 126/618 |
| 4,478,211 A | | 10/1984 | Haines et al. | |
| 4,552,208 A | | 11/1985 | Sorensen | |
| 4,574,779 A | * | 3/1986 | Hayes | 126/641 |
| 4,607,688 A | | 8/1986 | Sorensen | |
| 4,611,654 A | | 9/1986 | Buchsel | |
| 4,671,252 A | | 6/1987 | Haines et al. | |
| 4,676,225 A | * | 6/1987 | Bartera | 126/636 |
| 5,351,488 A | | 10/1994 | Sorensen | |
| 5,357,906 A | * | 10/1994 | Brazier | 122/32 |
| 5,823,177 A | * | 10/1998 | Whitehead | 126/640 |
| 6,142,216 A | * | 11/2000 | Lannes | 165/70 |
| 6,165,380 A | * | 12/2000 | Ilves et al. | 252/77 |
| 6,827,091 B2 | | 12/2004 | Harrison | |
| 7,171,972 B2 | | 2/2007 | Harrison | |
| 7,201,215 B2 | | 4/2007 | Ippoushi et al. | |
| 2009/0188447 A1 | * | 7/2009 | Lutz | 122/17.1 |

OTHER PUBLICATIONS

William J. Schenker, M.D.; *Crickets in the Country*; Home Power; Issue 21; Feb./Mar. 1991; p. 43.

Anon.; *The Copper Cricket: Illustrated Article*; Unknown Publication and date.

* cited by examiner

ADAPTIVE SELF PUMPING SOLAR HOT WATER HEATING SYSTEM WITH OVERHEAT PROTECTION

This application claims the benefit of U.S. Provisional Application No. 61/195,288, filed on Oct. 6, 2008, which is hereby incorporated by reference in its entirety.

SUMMARY OF THE INVENTION

The new system has a self pumping solar loop which is directly propelled by solar heat. The circulation does not require any mechanical components, motors, pumps, valves, electronic components, controllers, sensors or wires. This avoids common reliability problems and provides significant cost savings in material and installation labor. The new system uses one or more standard flat plate collectors and a standard hot water storage tank. No special made collectors or tanks are required.

The new system is quick and easy to install or to retrofit in an existing residential hot water system. Time and costs are saved. No soldering is required, because of easy to use fittings. The new maintenance free-system produces savings in purchasing, ownership and carefree operation. Only a single roof penetration for collocated piping is required. Usage of flexible tubes provides cost savings and easy installation. The system has silent operation.

The system has an automatic temperature-limiting mode, which avoids positive pressure and scalding hot temperatures in the storage tank—saving an expensive anti-scalding valve.

The system has an automatic overheat protection system, which drains the collectors at extreme situations for safety and to protect chemical properties of the heat transfer fluid. The system can be safely operational without any hot water draw for long periods. The system is free from stagnation in the collectors; there is no risk that high temperatures can break down the chemical composition of the heat transfer fluid.

An automatic system for creating vacuum automatically restores vacuum, if needed, and results in easy installation and carefree operation. The system is fully closed; no concerns exist that vacuum or fluid will be lost.

The system is freeze protected using a mix of food safe propylene glycol, water and ethanol.

The system automatically adapts flow and temperature to match the amount of insolation. No check valve is needed, as reverse thermo-siphoning is not possible.

Use of a high performance heat exchanger results in a high temperature output and an excellent heat transfer to the hot water in the storage tank. An internal heat exchanger coil or a side-arm heat exchanger can be used. For cost effectiveness, a side-arm heat exchanger can be used and fitted or retrofitted to a standard tank without soldering. This combination produces an immediately usable hot layer of >40° C. water in perfect stratification within the hot water tank.

The heat exchanger can be added to a standard hot water tank, inexpensively using the drain port at the tank's base and the temperature and pressure port at the tank's top. The connections use standard ¾" T fittings and standard flexible pressure hoses with nut/fitting connectors. The temperature and pressure (T&P) relief valve is unscrewed from a standard tank. A top T-fitting is connected in the place of the T&P relief valve, and the T&P valve is screwed back at the top of the T-fitting. The top of the heat exchanger is connected to the other port of the top T-fitting via a standard flexible water heater pressure hose. At the bottom of the tank, a drain valve is removed from the drain port. A bottom T-fitting is attached to the drain port. The drain valve is screwed in one side of the bottom T-fitting. The other side of the bottom T-fitting is connected to the bottom of the heat exchanger. The domestic cold water and hot water ports remain unchanged.

Tight couplings ensure hermetic seals for cross-linked polyethylene PEX tubing in the solar loop. Use of standard flare fittings provides easy and quick, solder free and hermetically sealed connections of the passive solar pump unit to the solar collector.

A new method of passive fluid pumping for solar water heaters is provided. Standard commercially available solar collectors are employed. Two solar collectors can be served with a single passive fluid pumping unit, providing a further cost saving.

The invention provides a new solar heat driven self pumping unit. A passive method is employed to automatically restore vacuum, if needed. The fully closed system is without risk of fluid loss by evaporation to ambient.

Available fittings enable use of low cost and easy to install flexible PEX tubing without vacuum loss. No soldering is required for installation. Installation of the new system does not require soldering and uses nut and O-ring fittings, flared fittings and union couplings. The collector is prepared with matching fittings which easily are added to standard collectors at the factory or locally.

The system will be filled with the correct water/glycol/ethanol mixture as heat transfer fluid. The correct fill level should be observed. There is no need to manually pull system vacuum initially.

Basic physics are used for all operations: pumping, restoring vacuum, temperature limiting and purging fluid in case of overheating. Only one valve is used. It is normally always closed. Although basic physics principles are used, novel and unobvious contributions of the invention include improvements over previous solar hot water systems.

One previous system has a specially designed single collector with fixed risers extended high above the collector in a specially brazed collection manifold. In contrast, the new device can be added to one or more standard collectors with various sizes.

The invention would not have been obvious, because it decouples the pumping mechanism from the collectors. Extensive research and development has been conducted to design the new passive solar pump that works well under all conditions.

The following new results have been produced in the invention, which creates an efficient and aesthetic fluid pump system, avoids pressure buildup in the closed loop system, allows fluid expansion due to thermal expansion and includes a overheat protection mechanism, which allows operation and protects the chemical composition of the glycol.

The new system uses an indirect geyser pumping method. Steam bubbles produced in the collector result in a geyser pumping action in an externally fitted exit tube manifold. The separation mechanism of fluid and vapor is also new. Added benefits are that more fluid-volume is pumped, and no complex bubble nucleation devices are required.

In prior art systems each riser has its own exit-tube sticking out above the collector, above which creates a visually obtrusive design. That prevented use of a standard collector. That also does not cater to multiple collectors connected to a single pump and shared heat exchanger loop. In addition, steam vapor bubbles quickly condense and shrink in the empty cooler riser tubes, which further reduces their effectiveness.

The new invention is superior in performance, is dramatically improved aesthetically and at the same time is more flexible, less complex and less costly. The new system automatically initiates and maintains vacuum, which makes the system much easier to install and avoids maintenance concerns of losing vacuum over time. Vacuum loss has been a problem in the prior art systems.

The pumping action in the new invention is a four stage system. The sun warms up fluid in risers connected to the absorber in the collector. Due to thermo-siphoning the hottest water rises to the top of the risers. Due to the lowered pressure in the system, the fluid will reach a boiling point at a low temperature. This creates steam bubbles, which result in a volume expansion factor of 1600. The bubbles drive and lift slugs of hot fluid to an elevated hot fluid reservoir. A fluid balance principle causes circulation in the solar loop—transferring hot fluid through the heat exchanger, and thereby transferring heat to the storage tank. Cooled fluid is returned from the heat exchanger to the solar system cooler fluid reservoir. Vapor from the risers is separated from the hot fluid, and returned to and condensed in the cooler fluid reservoir. The heat freed by the vapor condensation preheats fluid returning to the collector.

The heat transfer fluid should have a low boiling point. The heat transfer fluid should not freeze to avoid bursting of the collector and tubing. A mixture of water, glycol and ethanol is used as the heat transfer fluid. It offers a low freeze protection temperature. Under the moderate vacuum the system operates in, the system starts pumping at a temperature of 35° C. The minimum operating temperature can be chosen by selecting the mixture proportions. The heat transfer fluid has a good heat transfer capacity. The system limits high stagnation temperatures, and the fluid keeps chemically stable. Water, ethanol and propylene glycol is a safe and nontoxic fluid mixture. This allows use of a single-walled heat exchanger.

The expanded steam vigorously pushes against the hot fluid in the solar collector's top manifold. The fluid and steam bubbles can escape only through the exit-tube, which is connected at the external port of the collector's top manifold. Eventually the steam bubbles will escape through the exit-tube following the pumped out hot fluid. Since the cool fluid level in reservoir R2 is positioned slightly higher than the top manifold, the top manifold will refill with heat transfer liquid feeding up from the bottom of the collector using the fluid gravity balance principle.

The number and diameter of the exit-tubes are chosen large enough to allow enough fluid to escape without much restriction, but small enough so that it is not possible for steam to travel through the fluid. The steam bubbles will push all of the fluid slugs up the tube.

The steam bubbles will also provide a downward force, but since the volume of water in the top manifold and exit-tube is much lower compared to the volume of the water below in the collector, there is minimal reverse flow. A specially designed one-way valve with low flow restriction at the bottom of the collector can slightly improve pumping efficiency, but the valve is not strictly required. A very simple one-way valve was developed for this purpose. The system can work without this valve, and even if the valve fails, the performance of the system is not significantly impacted.

The hot fluid in the exit-tube is pushed to a higher level and partially fills reservoir R1. The fluid level of reservoir R1 will become higher than the fluid level in reservoir R2. Both reservoirs are in communication using two routes; one for vapor and one for fluid. The two reservoirs will always have the same gas pressure above the fluid. Both reservoirs communicate via a long U-tube filled with fluid, with the heat exchanger being the lowest part of the U-tube. The system circulation is based on the fluid gravity balance principle. Hence, the fluid will seek equilibrium level. The fluid in reservoir R1 will flow down through the system until it reaches the same fluid level as in reservoir R2. Since reservoir R2 has a very large volume compared to reservoir R1, the fluid level in reservoir R2 remains at virtually the same level.

The design and diameters of reservoir R1 are chosen wide enough to accommodate all fluid pushed out by the exit-tube without overflowing directly to reservoir R2, but small enough to provide rapid increase of the fluid level. The higher the level, the bigger the pressure and the higher the flow in the heat exchanger loop.

Several inches of difference in level between reservoir R1 and reservoir R2 is sufficient to provide adequate flow through the heat exchanger loop. However, the temperature of the fluid in the hot fluid down leg of the heat exchanger loop is much higher then the temperature of the cooled fluid in the return leg of the heat exchanger loop. The hot fluid has a lower density and hence a lower weight. The result is that the hot fluid stands at a different level while at rest. Increasing the height of reservoir R1 compensates for this. The vertical distance between the tank and the collector determines the minimal offset for the height compensation needed for reservoir R1. For practical purposes a vertical distance from the top of the collector to the hot water tank is best limited to three floor-levels or 30 feet. The minimal height of reservoir R1 is directly related to the vertical distance of the heat exchanger loop.

The tube from reservoir R1 to the heat exchanger needs to be insulated to avoid heat losses, as fluid in this tube is warmer than ambient. The return tube will be relatively cool, but efficiency of the system is higher if this return tube is also insulated.

Normally pressure would build up quickly in the closed system, which would result in an ever increasing pressure and increased boiling point. But returned fluid to reservoir R2 is cooled down as heat is transferred in the heat exchanger to the storage tank. The temperature of the fluid in reservoir R2 is relatively low compared to the temperature in the top manifold of the solar collector. The relatively low temperature also improves collector efficiency.

The hot steam bubbles created in the collector are led into reservoir R2, where they condense upon contact with the low temperature fluid and walls of reservoir R2. The overall pressure in the system is controlled by the vapor pressure or the dew point maintained in reservoir R2. This results in a fairly constant reduced pressure or vacuum in the system. The vacuum in the systems is thus maintained, which allows the fluid to continue to boil at low temperatures. The cool return fluid will warm up due to the heat from the condensation process. This essentially will preheat the fluid returning to the bottom of the collector, which is desirable so this energy is not lost.

Under operation, the temperature of the return fluid will slowly rise, as the temperature in the hot water storage tank slowly rises. This higher temperature will result in a slightly higher pressure, which results in an increased boiling point. This makes the system adaptive. Boiling point temperature and flow rate are related to the tank temperature, which is desirable. Traditional systems only can switch on or off. After the system cools down, a low pressure returns, which enables an early start temperature of the system. No controllers, sensors, electromechanical pumps, drip valves, check valves, expansion tanks, etc are used in this new system.

The new system starts pumping at low temperatures and increases pumping while water tank temperature rises. Note that the heat exchanger will be fed with cool water from the bottom of the hot water tank until the entire tank is heated up. If bottom tank temperature is eventually getting relatively high, the system adapts and operates at higher temperatures and still provides fluid warmer than the hot water tank temperature.

An important consideration is to avoid stagnation in the system. Traditional systems can be damaged if the pump is switched off and fluid in the collector becomes overheated. Once glycol in conventional systems exceeds a certain temperature, the chemical composition will break down and become corrosive, resulting in leaks, and the composition loses its freeze protection characteristics.

The new system is automatically protected against overheating. If the system receives daily sun without hot water consumption, for instance during a vacation, the storage tank will eventually reach a high temperature. The new system is created to deal with this situation. The system reduces circulation due to increased hot water tank temperature and due to increased pressure. If the system pressure reaches 1 bar, the boiling point will be 100° C. A standard flat plate collector will radiate a large percentage of the collected heat at these temperatures. A flat plate collector becomes less efficient at higher temperatures. Circulation will continue, albeit increasingly slower. While the boiling temperature is 100° C., the fluid pumped from the top manifold is always at a slightly lower temperature. Heat will be exchanged to the tank via the heat exchanger.

If the tank reached a maximum temperature, no heat would be exchanged in the heat exchanger. High temperature fluid would exit the heat exchanger. Since the ambient temperature is much lower than the fluid temperature, heat will be dissipated to the air. Once the hot fluid reaches reservoir R2, the heat will continue to radiate to ambient air. Even if the air temperature were 40° C., there would still be a significant delta T to dissipate heat from reservoir R2 to ambient air. In high temperature locations, reservoir R2 can be equipped over its full length with fins to increase radiation to ambient air. The fluid travels relatively slowly through the reservoir R2, as it has a larger volume. This allows ample time for the fluid to cool down. The return tube to the collector is the final stage for fluid to cool down.

The maximum pressure in the system is limited to 1 bar, and hence the boiling point is 100° C. A valve in the overflow reservoir R3 will vent overpressure. The steam condenses to a liquid in the vacuum line to R3 and is further condensed in the cooler liquid accumulated in R3. This mechanism acts a pressure and temperature limiting system. This also limits the maximum temperature provided to the heat exchanger.

The system continues to operate in a temperature limit mode until the temperature of the fluid returned from the heat exchanger exceeds a certain temperature—which only occurs if the tank is fully heated. This steam venting will also purge any air out of the system—which guarantees a strong vacuum automatically forms in the system after it cools down. This mechanism will ensure the system will always create the desired vacuum needed for optimal operation. The vacuum will also be automatically created during first use.

The system switches to overheat protection mode by forcing all fluid from the collectors to the overflow reservoir R3. Once the temperature of the fluid returned from the heat exchanger gets too warm, the amount of steam produced under strong insolation will become too much to be vented through the flow restriction in the steam release line. This restriction in the temperature limit system causes a slight overpressure in the system if insolation is strong and without cooling fluid returning from the heat exchanger. This causes head pressure in fluid drain line, which then starts to drain fluid directly to the overflow reservoir. The dimensions of the tubes and the height of the fluid drain line are chosen carefully to have the system start draining at the right moment. Within a short period of time, all fluid will be purged from the collectors to overflow reservoir R3, and afterward the pressure equalizes. As no fluid is left in the collectors, no circulation is possible, and the system is safely at rest during this period of excessive isolation with a fully heated hot water tank. The glycol mixture is stored in reservoir R3, and will not suffer from chemical breakdown due to high stagnation temperatures. Effectively, the system acts automatically as a drain down system.

Once the collectors cool down, a vacuum is formed, and all fluid is drawn back into the collectors. This is possible because the valve has a float, and the valve stays open until all fluid is drawn back from reservoir R3. Once all fluid is drawn back, the float valve will close, and the resulting vacuum and ambient air pressure will tightly close the valve. The valve remains closed under normal operation—as the system operates normally under lower then atmospheric pressure.

Reservoir R3 will only receive fluid—either condensed steam or purged fluid. Therefore, reservoir R3 can be sealed off with a flexible watertight cover that can adjust with rising fluid level in R3. This prevents fluid loss in the system due to evaporation. The entire system is fully closed.

While the system operates, the heat transfer fluid will heat up and hence expand in volume. To avoid the need for an external expansion tank, reservoir R2 is created to act as expansion reservoir. In a cool condition the reservoir should be filled $1/3$. The volume of reservoir R2 is dimensioned such that it will fill to $2/3$ at hot fluid temperatures. This will avoid pipes bursting from fluid volume expansion. It is important that the system is not overfilled in a cool situation. The shape and position of the fill opening ensures a desired initial fill level.

The special heat exchanger system matches the remainder of the new system and provides low cost. The new system provides excellent temperature stratification in the hot water storage tank and immediately provides hot, usable water at about 40° C. or more. Hot water leaving the heat exchanger flows to the top of the storage tank and remains in the top, moving downward as more hot water flows into the tank. Hot water for use is drawn from the top of the tank.

The flow rate in the system automatically is adapted to the insolation and tank temperature. The flow is relatively slow to allow maximum heat transfer in the heat exchanger, which then returns relatively very cool fluid back to the collectors. This results in a higher operating efficiency of the collectors—as the temperature difference with the ambient temperature is lower.

The heat exchanger transfers almost all heat from the solar collector to water circulating from the tank, returning to reservoir R2 with cool fluid to maintain a low operating pressure and hence a low boiling point.

A device is added to initiate and maintain a proper vacuum in the system—to ensure a low boiling point and an efficient operating temperature. A one-way valve allows steam vapor to escape if pressure in the system becomes higher than ambient pressure (1 bar). During first operation the system will be at ambient pressure and the heat transfer fluid will boil at 100° C. The fluid in the collector and pump will expand due to heat up, and the steam vapor in reservoir 2 will displace all the air in the system and will vent the air through the float valve, in reservoir R3. Once the pumping action starts, cool fluid flows from the heat exchanger reservoir and the collector and pump. This will rapidly reduce the total fluid volume and dew point. This results in a rapid decrease of pressure which closes the one-way valve. The lower pressure results in a lower boiling point, increased flow and a lower of system temperature. The system pulls a strong vacuum due to condensation and reduction of fluid volume. If vacuum reduces over time from the closed loop system, the system will automatically restore the vacuum every time the pressure in the system exceeds 1 bar.

To prevent fluid loss from the system, the valve vents to an expandable reservoir R3. The pressure of the reservoir will always be 1 bar due to expansion. To avoid liquid build up due to condensation of steam, a one-way float valve will be positioned at the lowest part of the reservoir R3. If liquid exists in reservoir R3, the one-way float valve will float on the fluid and will not shut before all fluid is drawn back in the system. Once all fluid is pulled out of the expandable reservoir, the one-way float valve will close and stay closed, thanks to the strong vacuum. The expandable reservoir can also act as an overflow reservoir in extreme hot conditions. The entire system is however fully closed, so no fluid loss due to evaporation to ambient air is possible.

These and further and other objects and features of the invention are apparent in the disclosure, which includes the above and ongoing written specification, with the drawings.

DETAILED DESCRIPTION OF THE DRAWINGS

Figure 1:
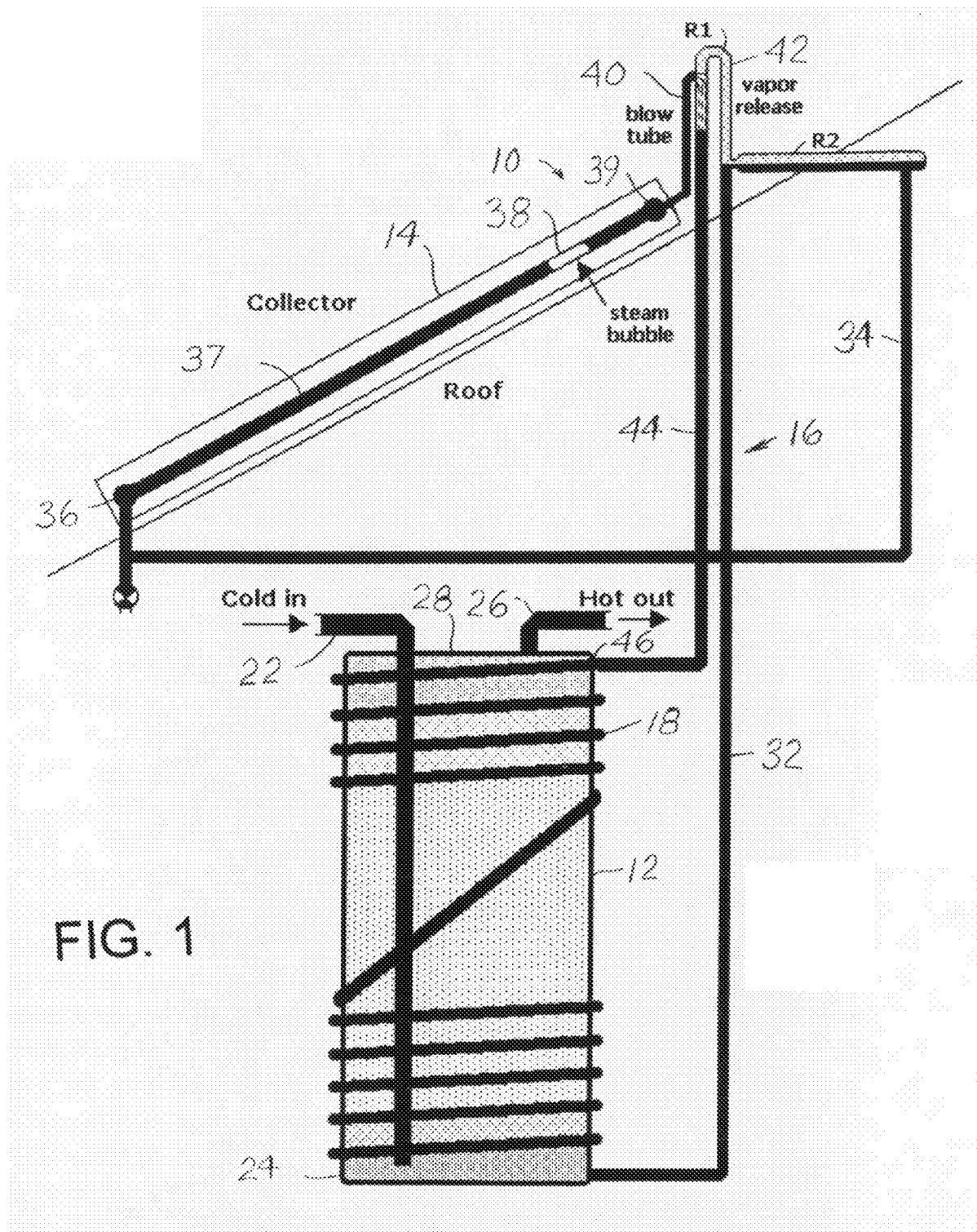
FIG. 1 schematically represents the new system with a standard hot water storage tank with cold water inlet and hot water outlet. A heat exchanger is schematically shown wrapped around the hot water tank.

Referring to FIG. 1 the new automatic water heating system 10 has a standard hot water tank 12, a roof mounted flat panel collector 14, connecting tubing 16 and a heat exchanger 18. As hot water from the tank is used, cold water flows in through standard inlet 22, flows downward and is released into a bottom 24 of tank 12 to maintain tank stratification. On demand, water flows out of the top 28 of hot water tank 12 through standard hot water outlet 26.

Connecting tubing 16 includes a cool liquid rise return tube 32 which returns cooled liquid from heat exchanger 18 and partially fills reservoir R2. Cool water flows from reservoir R2 through tube 34 to the horizontal lower manifold tube 36 in collector 14. The liquid is heated in parallel sloped riser tubes 37 in collector 14. The heated liquid flows upward to the hotter upper part of the collector, where steam bubbles 38 form. The steam bubbles force slugs of the heated liquid into the upper header manifold 39 and up through exit-tube 40 to reservoir R1. The steam bubbles push the hot liquid between the steam bubbles up through exit-tube 40. Reservoir R1 releases the hot steam vapor through tube 42 to reservoir R2 for condensing. The hot liquid flows downward in tube 44 to the upper hot end 46 of the heat exchanger 18.

The hot liquid in this heat exchanger 18 configuration sequentially heats the water in the hot water storage tank 12 in counter flow, first heating the water in the top 28 of tank 12 and finally heating the coolest water in the bottom 24 of tank 12 as the downward flowing heat transfer liquid reaches the bottom of the heat exchanger 18.

Reservoir R2, shown schematically for clarity, runs along the top of the collectors 14.

Pipe 34 in FIG. 1 is shown on the right side of reservoir R2. However, testing showed it is better to place this connection on the left side of reservoir R2. It makes the system more efficient as the fluid on the left side is hotter due to condensation heat. It also results in a cooler right side of reservoir R2, resulting in a lower dew point and greater condensing of the steam, and hence a lower operating vacuum. It also creates a unit where all connections on reservoir R2 are positioned together.

The difference in height between the hot liquid in reservoir R1 and cool liquid in reservoir R2 causes the liquid to flow through the connecting tubing 16, the heat exchanger 18, the solar collector 14, the risers 37 and the top manifold 39.

Figure 2:
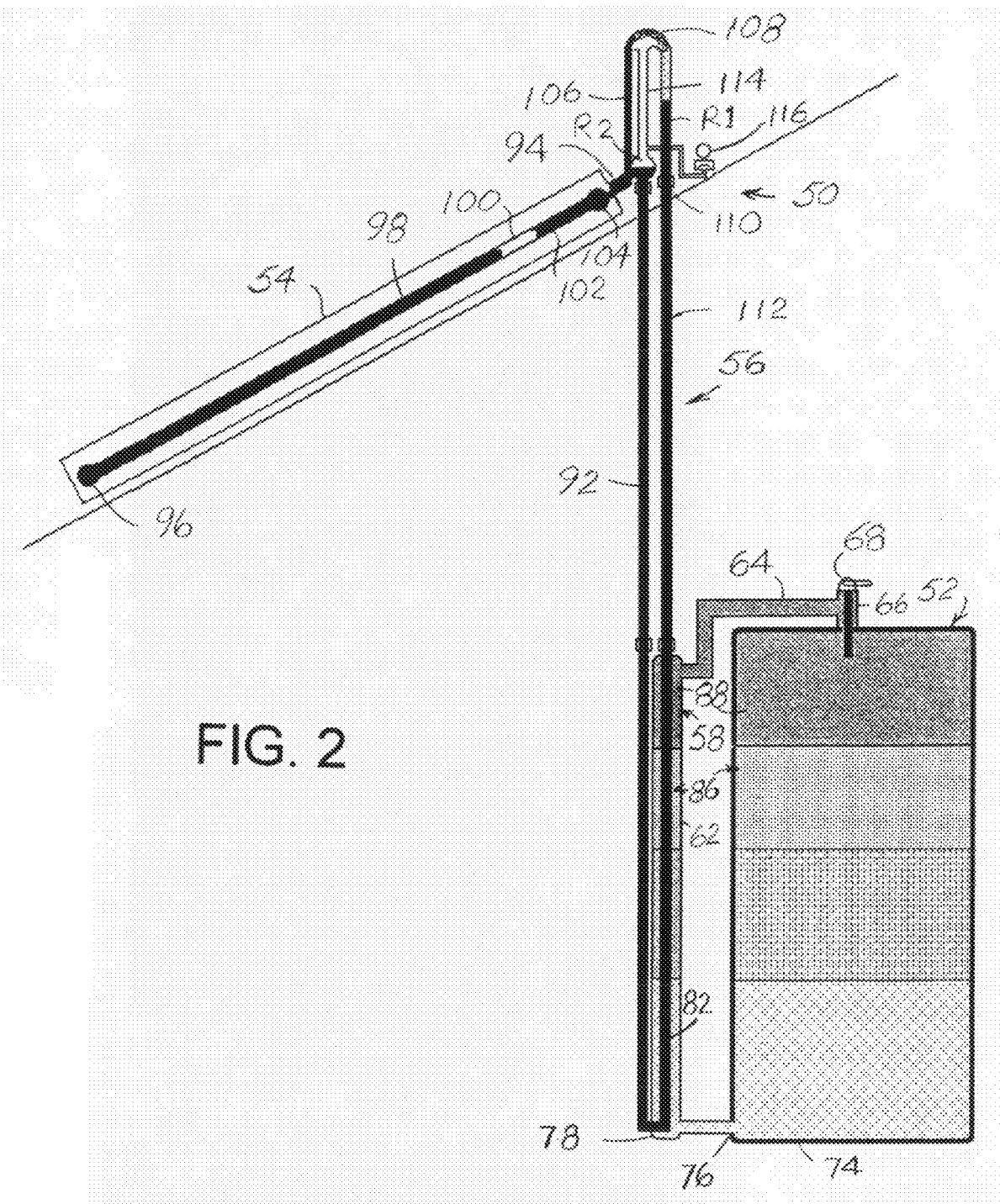
FIG. 2 is a schematic side elevation of an embodiment of the new system, using a side-arm heat exchanger retrofitted to the hot water tank.

FIG. 2 shows an embodiment of the invention in which system 50 uses a standard hot water tank 52, a standard flat panel solar collector 54, connecting tubing 56 and a side-arm heat exchanger 58 external to the hot water tank 52. Outer tube 62 of heat exchanger 58 is connected by tube 64 to a T 66 which connects the pressure and temperature (P&T) relief valve 68 to the hot water tank. The incoming hot water from the heat exchanger stratifies to provide hot water from the top of tank 52 on demand. Heat exchanger 58 is easy to retrofit between drain port 76 and T 66 at the P&T relief valve 68.

The bottom 74 of tube 62 on hot water storage tank 52 has a normal drain port 76, which is connected to the bottom 78 of the outer tube 62 of heat exchanger 58. Hot liquid in the inner tube 82 flows downward and heats the water inside the outer shell 62. Due to thermo-siphoning, an upward counter-flow results in a circulation through the outer shell 62 and the tank. The hottest water from the heat exchanger 58 flows into tank 52 which quickly reaches 40° C. in zone 88 and is readily available on demand for domestic use.

The cooled circulating heat transfer liquid, from which heat has been removed in the heat exchanger, flows upward in return tube 92 to reservoir R2. The cool liquid flows downward in a central tube 94 (also show as tube 34 in FIG. 1), by the flat panel solar collector 54 to the bottom manifold pipe 96 and then upward through internal heating riser pipes 98. As the liquid reaches boiling temperature, gas bubbles 100 are formed. The bubbles push liquid slugs 102 into header manifold 104 and upward through exit-tube 106 at substantial velocities. The hot liquid slugs speed upward through the exit-tube 106 and around the U-shaped upper end 108 with centrifugal force. The hot liquid slugs fall into reservoir R1 at the upper end 110 of down tube 112. The upper reservoir R1 has a liquid level higher than the level in reservoir R2. The unbalanced mass of liquid causes the flow downward through insulated hot liquid tube 112, through the heat exchanger 58 and upward through uninsulated or insulated cooled liquid return tube 92 to reservoir R2.

Internal vapor pressure is maintained equal in reservoirs R1 and R2 by vapor tube 114, which is internally connected to the U-shaped upper end 108 of the exit-tube 106. A safety over-pressure relief valve or plug 116 set for 3 bars is connected to vapor tube 114. Two standard flat panel solar collectors 54 may be connected to reservoirs R1 and R2 by extending lower and upper manifolds 96 and 104 and reservoir R2 across both collectors or by centrally interconnecting two R1 and R2 reservoirs. Two top manifold headers may be centrally connected to a single exit tube 106, 108 and pipe loop 56.

Figure 3:
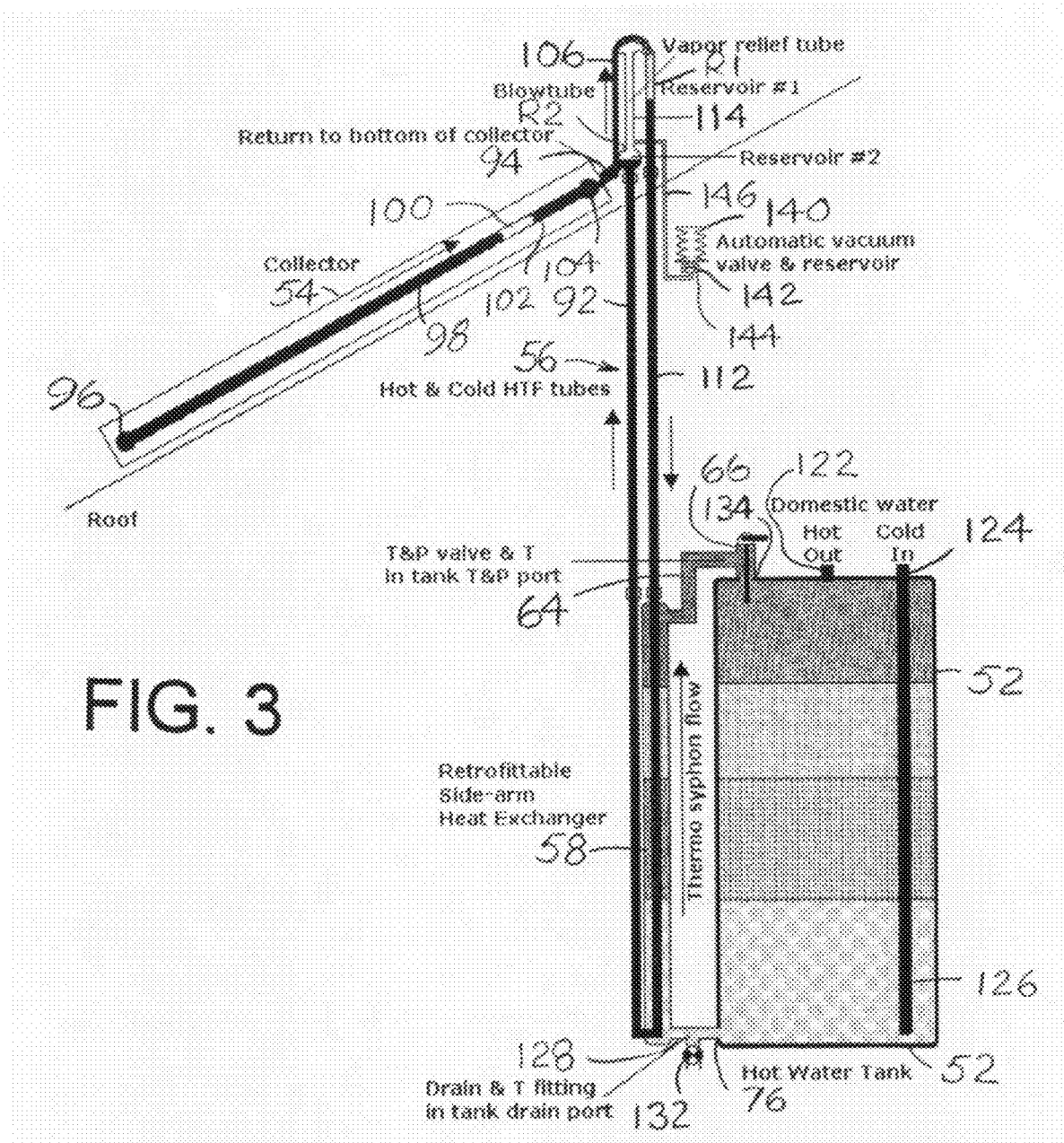
FIG. 3 is a schematic detail of the new system showing the standard hot and cold water connections to the hot water storage tank, the T at the drain, an expandable reservoir and a pressure equalizing tube connecting the expandable reservoir to the reservoir R2 and a float valve for returning heat transfer fluid from the expansion reservoir to reservoir R2.

FIG. 3 is a schematic detail of the new system showing the standard hot and cold water connections to the hot water storage tank, the T at the drain, and an expansion tank and a connection tube connecting the expansion tank to the pressure equalizing tube.

In FIG. 3, the domestic hot water outlet port 122 and cold water inlet port 124 are shown at the top of the hot water storage tank 52. Hot water is drawn from port 122 on demand by opening valves throughout a building.

The domestic cold water supply is connected to cold water inlet port 124, and internal pipe 126 conducts the cold fill water to the bottom of storage tank 52.

The T 128 at drain port 76 connects a drain valve 132 to the bottom of storage tank 5 and also supplies cold water from the tank to the bottom of the retrofit side-arm heat exchanger 58.

The water from the storage tank rises in counter flow through the heat exchanger 58 by thermal-siphon flow. The heated water is returned to the top of the storage tank 52 through tube 64 and T 66 connected to the standard T&P relief valve port 134.

An automatic, normally compressed expansion tank 140 has a float valve 142 in chamber 144, which is connected by tube 146 to pressure equalization vapor relief tube 114 between the two reservoirs R2 and R1. The expansion chamber compensates for excessive pressure and/or excessive liquid expansion in the new system.

A fill opening in reservoir R2 1$t$ ⅓ of its height needs to be filled until fluid flows out. That provides the required ⅓$^{rd}$ fill level.

To allow easy fill and to allow air to escape, it is best to keep the vacuum line to R3 or vacuum line 146 to the valve 142 and reservoir 140 disconnected while filling.

An option is to have the rubber fill plug act as over-pressure protection.

The system can be monitored using a pressure meter and (digital) thermometers at the heat exchanger level. There may also be a fluid level monitor/alarm.

Figure 4:
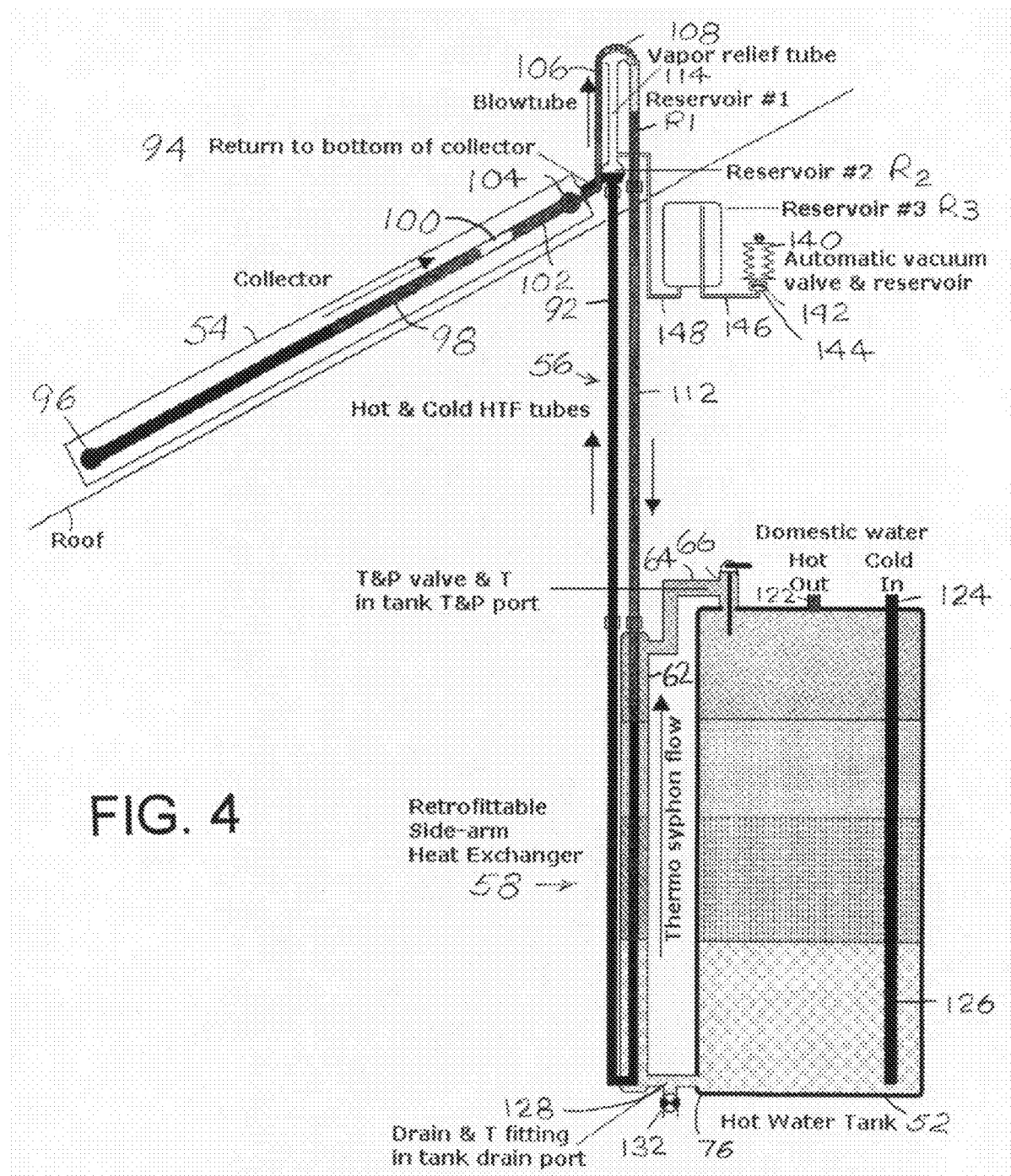
FIG. 4 is a schematic detail of the system similar to that shown in FIG. 3 with a third vacuum reservoir R3 added between reservoir R2 and the automatic vacuum valve and expandable reservoir.

FIG. 4 is a schematic detail of the system similar to that shown in FIG. 3, with a third vacuum reservoir R3 added between reservoir R2 and the automatic vacuum valve 142.

An increased volume for reservoir R2 is provided by reservoir R3. The larger the volume, the better the vacuum is maintained and the better the flow rate which improves performance.

Making a large reservoir R2 would require a large diameter copper tube, which should be as long as possible. That would be bulky, visible and costly, especially with today's copper prices. Since the larger volume only contains vacuum, a reservoir R3 under the roof is connected to reservoir R2.

The volume of reservoir R2 can be expanded by the third reservoir R3, which can be located lower than reservoir R2. The combined volume of reservoirs R2 and R3 avoids a quick drop of vacuum during heatup of the system. A lower vacuum ensures a low boiling point and hence a high flow rate, which results in better performance. Reservoir R3 can be connected via a small tube 148 to reservoir R2. Reservoir R3 will not fill with fluid, as condensed fluid will be sucked back into the main system through tube 148. That allows reservoir R3 to be placed under the roof. This also allows reservoir R2 to be relatively small, which makes the system more economical and even less obtrusive. Tube 146 conducts vapor from the top of reservoir R3 to automatic float valve 142 and automatic expanding vacuum reservoir 140.

In a side-arm heat exchanger such as 58, the outer water heating chamber 62 may slowly accumulate calcium carbonate buildup, which reduces flow and heat transfer. The calcium buildup is not caked on. It is just a loose, soft, soapy material. Most of it is actually transported into the heat exchanger 58 from sediments in the tank 52.

Figure 5:
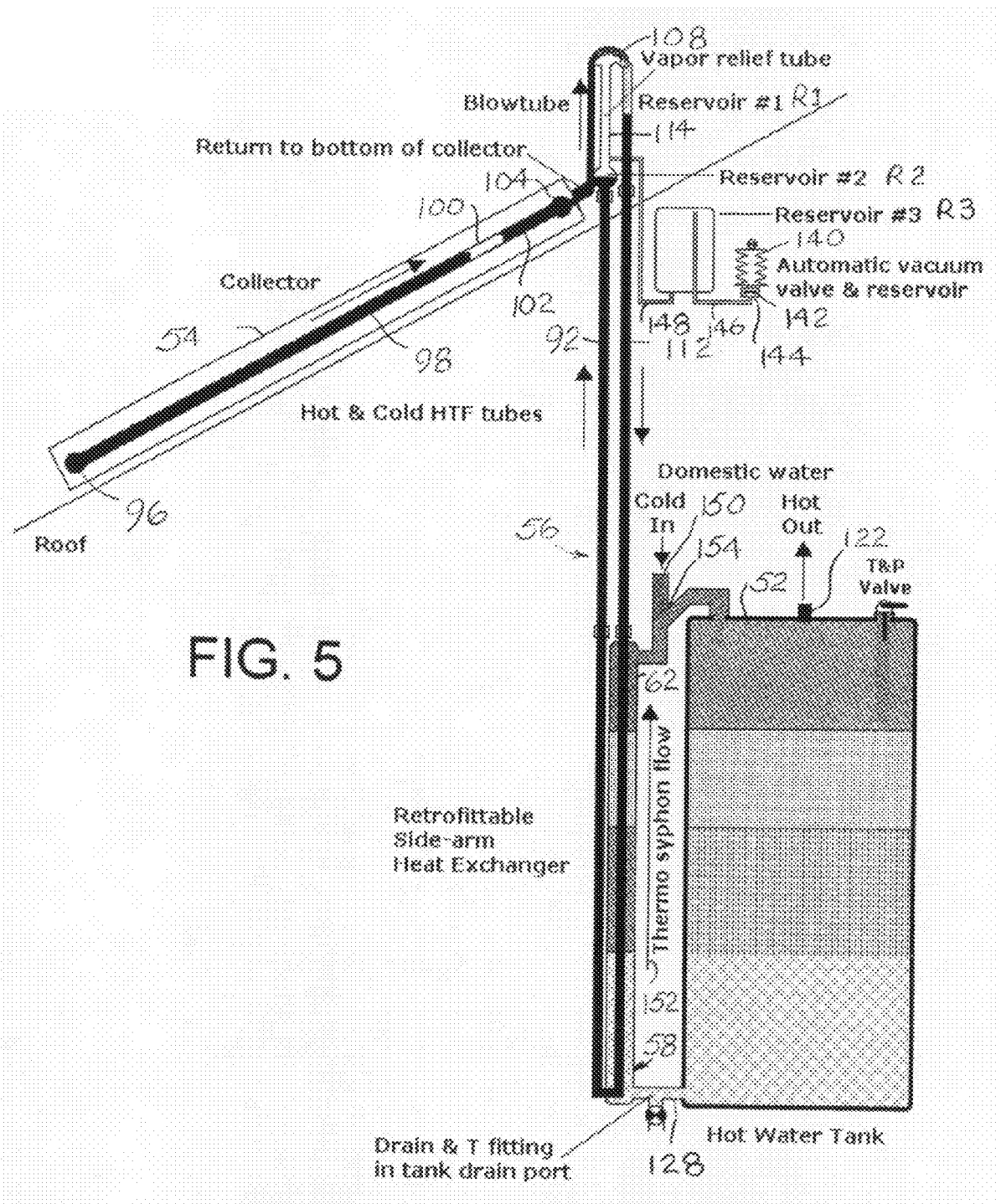
FIG. 5 is a schematic detail similar to that shown in FIG. 4 with a cold water Y inlet to flush the outer jacket of the side arm heat exchanger upon refilling the tank with cold water.

FIG. 5 is a schematic representation of a solar pumped fluid hot water heater with a unique cold water connection, which solves the problem of calcium carbonate buildup in the heat exchanger.

The structure in FIG. 5 is similar to FIG. 4, except for the new cold water refill fitting 150 on the tank 52. A cold water refill is usually a pipe opening near the bottom of the tank. Instead cold water refill 150 is connected to a new line 154, which connects the top of the outer chamber 62 in side-arm heat exchanger 58 to the top of the tank 52. The heat exchanger 58 operates in its normal counter flow thermal-siphon direction 152. However, when hot water is drawn from the tank through hot water outlet 122 cold water refill 150 speeds cold water downward through the new Y-connection line 154, into and through the outer chamber 60 of heat exchanger 58. The Y shape of the new connection line 154 directs the refill water mainly through outer chamber 62 to the bottom of the tank 52 through T 128. That periodic reverse flow cleans the inside of chamber 62 and prevents scale buildup.

To automatically clean and flush the side arm heat exchanger 58 the domestic cold water supply 150 is connected to the top of the outer chamber 62 and to the top of the side-arm heat exchanger 58. The heat exchanger outer chamber 62 is flushed with fresh, clean, high-flow cold water every time hot water is withdrawn from the tank 52 for use in the house. This may have a huge economic impact, especially since using an external heat exchanger is much cheaper and is retrofitable to a tank without adding an internal heat exchanger coil.

Figure 6:
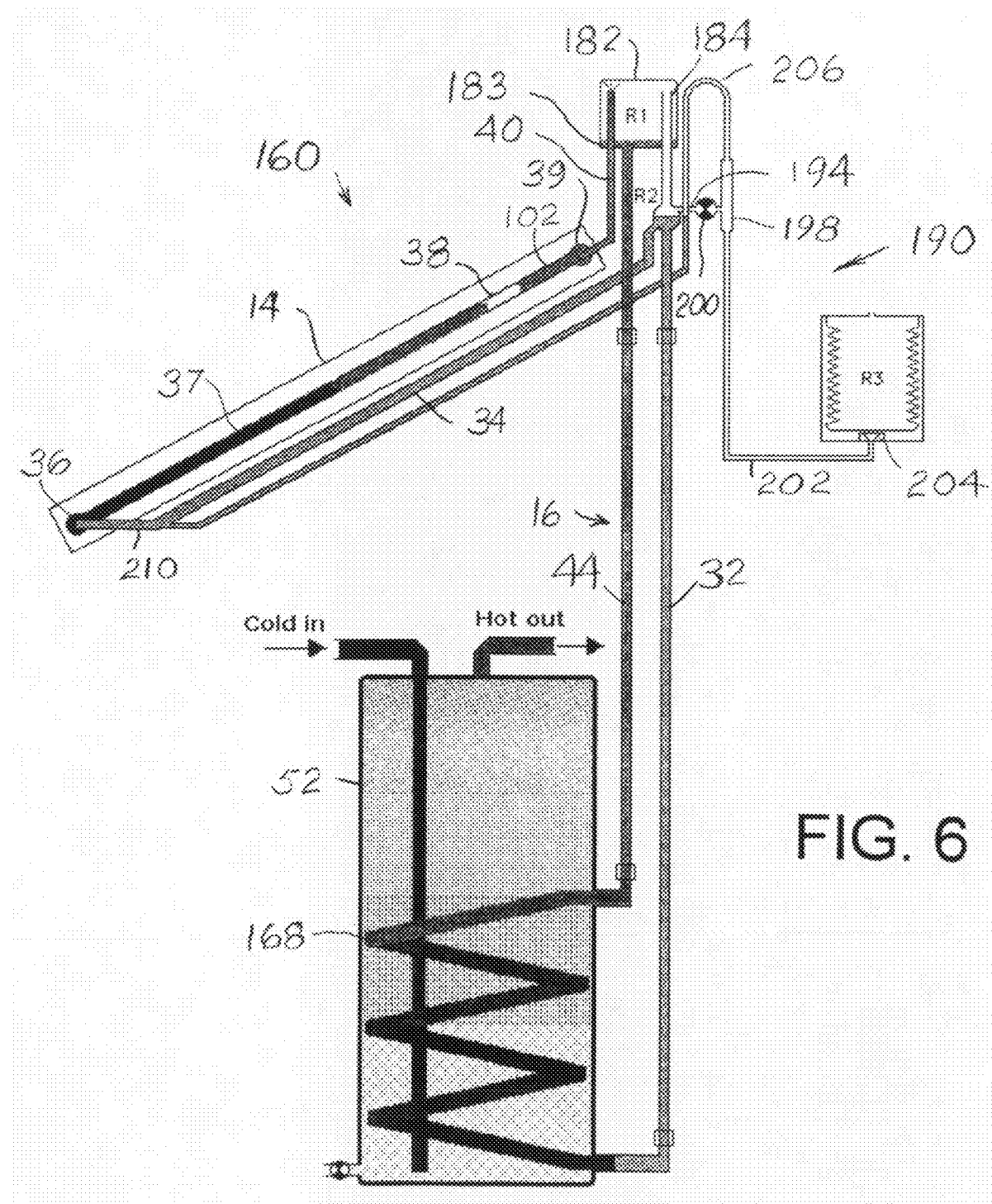
FIG. 6 is a schematic representation of the new system with a temperature limiting overheat protection sub-system, which transfers vapor through an orifice and transfers heat exchange fluid from the collector tubes and headers through a return line and U tube to the overflow reservoir R3. The tank as shown has an internal heat exchanger coil.

FIG. 6 shows a system 160 with hot and cold water piping to a hot water tank 52, a solar collector 14 and piping 16 connected to an internal heat exchanger 168. Hot heat transfer fluid from reservoir R1 flows downward in pipe 44 to heat the upper part of the heat exchanger 168. Cooler fluid returns through pipe 32 to reservoir R2. Pipe 34 returns the cool heat transfer fluid through a one-way valve 210 (shown in FIGS. 8-10) in return pipe 34 leading to the lower collector manifold 36. The fluid fills the parallel heating tubes 37 in collector 14. As the fluid reaches the top, it boils and forms steam bubbles 38 that drive slugs 102 of heat transfer fluid up through the upper collector manifold 39 and up through the pump or exit tubes 40. The slugs 102 of fluid fountain against the glass top 182 of the large reservoir R1. Hot fluid collects at the bottom 183 of reservoir R1 and flows downward in pipe 32. Vapor is collected in reservoir R1 and is removed to reservoir R2 from near the top of reservoir R1. Open pipe 184 returns the vapor to reservoir R2, where the steam and vapor condense in the cool liquid returning from pipe 44. The glass top 182 shows the active fountaining of the working system.

Large top reservoir R1 is used to accommodate a higher volume of fluid pumped, especially if two collectors are connected. The high level of the fluid in reservoir R1 creates high pressure in the heat exchanger loop 16 to ensure good flow. The mechanical construction of this embodiment is easy to manufacture.

The top 182 of reservoir R1 is made out of glass. Glass has a good thermal insulation, and it shows the pumping action clearly. This "fountain-like" action enables quick inspection of the system.

To use one pump unit exit tube or exit tubes for two collectors, the pump may be placed between the two collectors. This requires a double exit-tube upper manifold sub-system. It is difficult to install this between two collectors and results in a fairly large spacing between the two collectors. A pump can be mounted easily on one side of two collectors to make the system work well. The resulting pump unit can be used for all configurations, single collector and double collector, while collectors can have various area sizes.

Various fitting methods avoid soldering to connect all components, which lowers the barrier for do-it-yourself installers. Standard 1 inch union fittings can be used on the collectors to create vacuum-tight connections.

Figure 7:
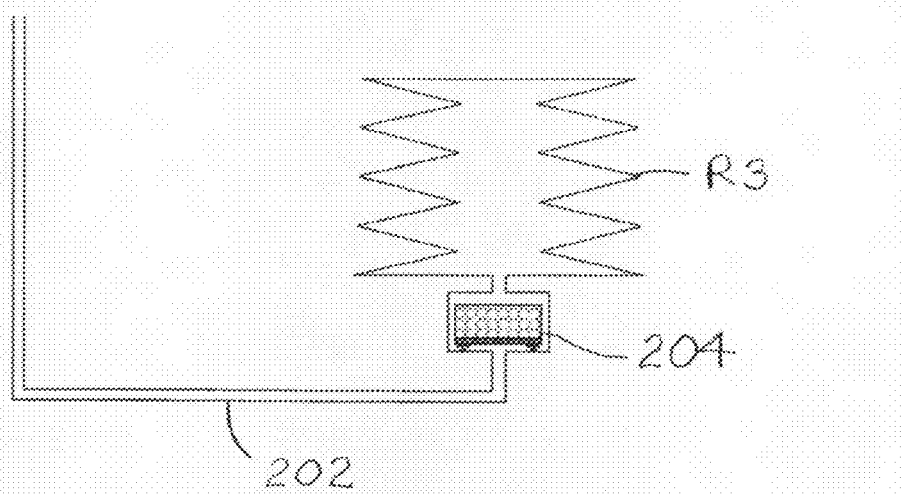
FIG. 7 is a schematic detail of the expansion tank, float valve and vapor retaining and heat transfer fluid returning expandable overflow reservoir.

As shown in FIG. 6, the temperature limiting and overheat protection system 190 is connected to reservoir R2 and to equalization tube 194. The steam line 194 is connected at the far end of reservoir R2, so steam will push out all air out of the system to ensure a strong resulting vacuum. A specific flow restriction orifice 200 in the steam line 194 allows a drain of excess system pressure. The T-configuration 198 makes sure steam is drained prior to heat transfer fluid, as shown in FIG. 6. An over heating makes liquid in R2 rise to a ⅔ level, and steam drains through orifice 200 to T 198 and line 202, and through float valve 204 to reservoir R3. Steam and heat transfer fluid may flow from upper U-tube 206 to line 202. Heat transfer fluid and steam flow into reservoir R3 through line 202 and float valve 204, as shown in FIG. 7 and expand the reservoir upon the system overheating. As the system cools, for example at night or when drawing hot water from the tank, pressure in the system is lowered. Float valve 204 remains open while heat transfer fluid is in the tank, resulting in return of heat transfer fluid to the system through line 202, tube 206 and orifice 200 to the system.

Figure 9:
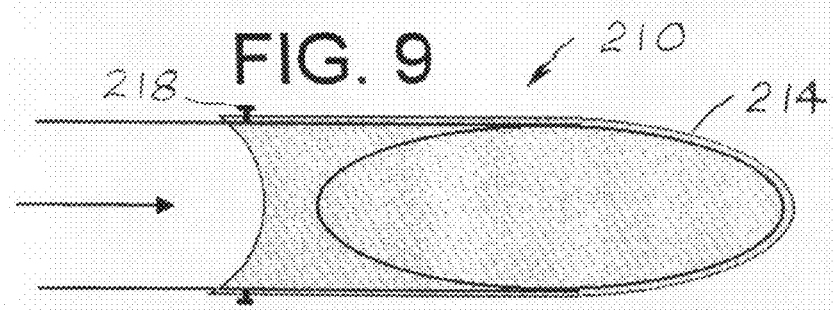
FIGS. 8, 9 and 10 are side, top and end views of a one-way valve with minimal flow restriction.
Figure 8:
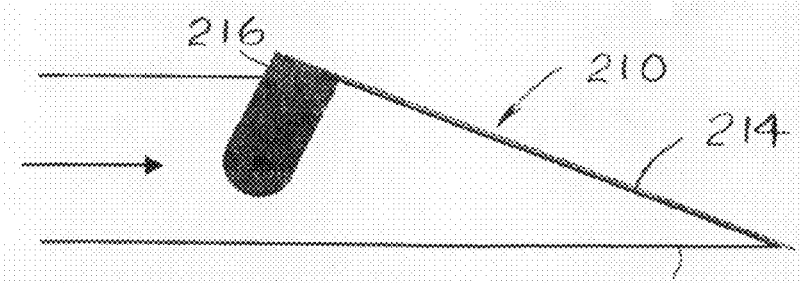
Figure 10:
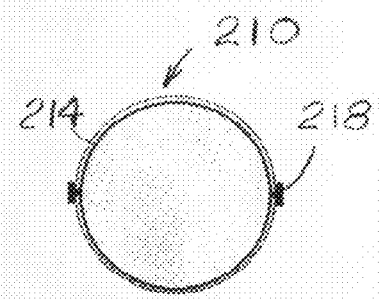

A one-way valve 210 shown in FIGS. 8, 9 and 10 can be added at the lower collector manifold. This results in a slightly higher flow rate in the system, which improves performance. Valve 210 was created and tested for this purpose. The valve 210 opens virtually without restricting the flow, the valve closes easily if the flow reverses. The valve is extremely simple—there are only three parts. The valve can be placed (and removed/inspected if needed) inside the 1 inch union coupling at the lower connection to the collector. The parts of the valve 210 are the biased tube 212, the oval cover 214, its integral support 216 and hinge pins 218.

The float valve 204 is combined into a low cost overflow reservoir R3. A simple float valve and a simple plastic bag are used to seal the fluid and to avoid fluid evaporation from the system.

Using standard corrugated water pipes allows easy installation and provides a very good vacuum seal. Standard PEX fittings can be fitted on one end so no special machining is needed to create PEX fittings. The added benefit of using the corrugated tubes is that they avoid need for long pipes on reservoir R2 and that they can form a tight radius, to avoid stress on the PEX tubes. This allows PEX tubes to be routed directly against the underside of the roof. The corrugated tubes can also be used at the tank side.

The new system is low in cost, is easy to install and operates for decades without having to care or concern about it.

The new solar hot water system has no mechanical components, no electrical components, no valves, easy installation, no or minimal plumbing, and no glycol and operates under extreme conditions.

The new system provides high performance, care free operation, free from maintenance with no stagnation or overheating. The new system has significant lower cost and significantly reduces payback time, and has improved aesthetic appeal.

While the invention has been described with reference to specific embodiments, modifications and variations of the invention may be constructed without departing from the scope of the invention.

I claim:

1. A self pumping solar water heating system comprising:
   a solar collector having upwardly sloped or vertical panels with riser tubes,
   a lower collector manifold connected to lower ends of the riser tubes,
   an upper header collector manifold connected to upper ends of the riser tubes,
   exit tubes connected to the upper header for lifting hot heat transfer fluid,
   a first reservoir connected to the exit tubes for receiving the hot heat transfer fluid from the exit tubes,
   a first pipe connected to the first reservoir,
   a heat exchanger connected to the first pipe for receiving hot transfer fluid from the first reservoir,
   a hot water storage tank connected to the heat exchanger,
   a second pipe connected to the heat exchanger for returning the cooled fluid,
   a second reservoir positioned below the first reservoir and connected to the second pipe,
   a return tube connected to the second reservoir and to the lower collector manifold, and
   a vapor pipe connected from an upper part of the first reservoir for releasing vapor from the first reservoir to condensate in the second reservoir, further comprising a third reservoir connected to a top of the second reservoir and a float valve connected to a bottom of the third reservoir for opening to permit vapor and heat transfer fluid into the third reservoir and to permit the heat transfer fluid return from the third reservoir to the second reservoir.

2. The system of claim 1, further comprising heat transfer fluid in the riser tubes, the lower manifold, the first and second pipes and the heat exchanger and partially filling the second reservoir to about ½ to ⅓ full.

3. The system of claim 1, wherein the third reservoir is closed and expandable.

4. The system of claim 3, further comprising a heat transfer fluid flow line connected to the lower manifold and to the third reservoir, the flow line having an inverted U-shaped tube extending above the second reservoir for permitting flow of the heat transfer fluid from the lower manifold to the third reservoir via the flow line and the inverted U-shaped tube for flowing heat transfer fluid from the collector to the third reservoir when pressure increases in the riser tubes.

5. The system of claim 4, further comprising a pressure restriction orifice connected between the top of the second reservoir and the flow line for permitting flow of vapor from the second reservoir to flow to the third reservoir via the orifice and the flow line.

6. The system of claim 1, further comprising a one-way valve connected to the return tube and to the lower manifold for permitting flow from the return tube to the lower manifold while blocking flow in opposite directions.

7. A self pumping solar water heating system comprising:
one, two or more solar collectors having vertical or upwardly sloped risers for heating heat transfer fluid and forming vapor bubbles in the risers,
a lower manifold connected to lower ends of the risers,
an upper header manifold connected to upper ends of the risers,
exit tubes connected to the upper header manifold for lifting hot heat transfer fluid,
a first reservoir connected to the exit tubes for receiving the hot heat transfer fluid from the exit tubes,
a first pipe connected to the first reservoir,
a heat exchanger connected to the first pipe for receiving hot transfer fluid from the first reservoir,
a hot water tank connected to the heat exchanger,
a second pipe connected to the heat exchanger for returning the cooled fluid,
a second reservoir positioned below the first reservoir and connected to the second pipe,
a return tube connected to the second reservoir and to the lower manifold, and
a vapor pipe connected from an upper part of the first reservoir for flowing hot vapor from the first reservoir to the second reservoir to condense in the second reservoir, and
a third closed and expandable reservoir for receiving vapor from the top of the second reservoir in the third closed and expandable reservoir and a float valve connected to a bottom of the third reservoir for opening to permit vapor and heat transfer fluid into the third reservoir and to permit heat transfer fluid to return from the third reservoir to the second reservoir.

8. The system of claim 7, further comprising an inherent overheat protection system having a flow line connected to the lower manifold and to the third reservoir and having an inverted U-shaped tube extending above the second reservoir for transferring the heat transfer fluid from the risers to the third reservoir upon heat and pressure buildup in the risers.

9. The system of claim 7, wherein the first and second pipes are flexible, low cost and easy to install PEX tubes.

10. The system of claim 7, wherein the system is a simple solar heat self pumping system without electric pumps, controllers, wires or adjusting valves.

11. The system of claim 7, wherein the system is maintenance free with no mechanical components and is self emptying on overheating.

12. A method of heating, comprising:
providing a system with a solar collector with vertical or upward sloping risers,
connecting upper and lower manifolds to the risers,
providing heat transfer fluid in the lower manifold and in the risers,
forming bubbles of hot vapor in the risers and driving slugs of hot heat transfer fluid upward through the risers, through the upper manifold and through exit tubes to a first upper reservoir, separating the hot vapor and hot fluid in the upper reservoir,
flowing the hot heat transfer fluid through a first pipe and a heat exchanger for heating a second fluid,
returning cooled heat transfer fluid from the heat exchanger through a second pipe to a second lower reservoir,
receiving the hot vapor from the first reservoir in the second reservoir and condensing the vapor with the cooled heat transfer fluid therein, and
flowing the cooled fluid to the lower manifold and continuing the method,
providing a third reservoir, and
flowing hot vapor from a top of the second reservoir to the third reservoir upon excess pressure in the system.

13. The method of claim 12, further comprising operating the system without electricity at an internal pressure less than atmospheric.

14. The method of claim 12, further comprising providing overheat protection by flowing hot heat transfer fluid from the lower manifold through an inverted U-shaped tube to the third reservoir for overheat protection of the system.

15. The method of claim 12, further comprising providing flowing the hot vapor through an orifice from a top of the second reservoir to the third reservoir upon over pressure within the system.

16. The method of claim 12, further comprising providing a vapor line and an orifice between a top of the second orifice and providing automatic sub-atmospheric pressure restoring by flowing vapor and gas from the top of the second reservoir through the orifice of vapor line and check valve to the third reservoir.

17. The method of claim 12, wherein the collectors, risers and manifolds are standard, and further comprising retrofitting a geyser pump to the standard collectors by connecting the exit tubes, the first upper reservoir, and connecting the second lower reservoir and the third reservoir.

18. The method of claim 12 further comprising flowing vapor from the system into the third reservoir via a one-way float valve upon higher than atmospheric pressure in the system to automatically prevent over-pressure in the system, flowing condensed heat transfer fluid back into the system from the third reservoir via the float valve, when the system cools and pressure is reduced below atmospheric.

19. The method of claim 12, further comprising automatically flowing all of the heat transfer fluid from the collectors and manifolds into the third reservoir upon increased pressure in the system, and returning the heat transfer fluid to the collectors and manifolds from the third reservoir via the float valve when pressure in the system falls to sub-atmospheric.

20. A method of heating, comprising:
providing a system with a solar collector with vertical or upward sloping risers,
connecting upper and lower manifolds to the risers,
providing heat transfer fluid in the lower manifold and in the risers,
forming bubbles of hot vapor in the risers and driving slugs of hot heat transfer fluid upward through the risers, through the upper manifold and through exit tubes to a first upper reservoir, separating the hot vapor and hot fluid in the upper reservoir,
flowing the hot heat transfer fluid through a first pipe and a heat exchanger for heating a second fluid,
returning cooled heat transfer fluid from the heat exchanger through a second pipe to a second lower reservoir,
receiving the hot vapor from the first reservoir in the second reservoir and condensing the vapor with the cooled heat transfer fluid therein, and
flowing the cooled fluid to the lower manifold and continuing the method, further comprising providing an adaptive system in which flow and temperature adjust automatically by increasing pressure in the system, flowing fluid and hot vapor from the second reservoir through a float valve to a third expandable reservoir, and returning the heat transfer fluid from the third reservoir to the system when the system pressure falls.

* * * * *